United States Patent [19]

Epstein

[11] Patent Number: 4,786,144
[45] Date of Patent: Nov. 22, 1988

[54] CONTACT LENS HOLDER

[76] Inventor: Arthur B. Epstein, 24 Ravine Rd., Great Neck, N.Y. 11023

[21] Appl. No.: 13,332

[22] Filed: Jan. 22, 1987

[51] Int. Cl.⁴ .......................... G02B 7/02; G01N 21/01
[52] U.S. Cl. ...................................... 350/321; 350/252; 350/245; 351/160 R; 351/247; 356/244; 24/488
[58] Field of Search ............... 350/321, 251, 252, 256, 350/244–246; 351/160 R, 224, 225, 245, 247; 356/124, 244; 24/488, 499, 509

[56] References Cited

U.S. PATENT DOCUMENTS

| | | | |
|---|---|---|---|
| 2,997,918 | 8/1961 | Spear | 356/124 |
| 3,186,296 | 6/1965 | Erban | 350/245 |
| 3,297,291 | 1/1967 | Everett | 350/245 |
| 3,428,286 | 2/1969 | Pesco | 350/245 |
| 4,072,428 | 2/1978 | Moss | 350/245 |
| 4,232,966 | 11/1980 | Schpak et al. | 356/124 |
| 4,684,246 | 8/1987 | Downing et al. | 356/124 |

Primary Examiner—John K. Corbin
Assistant Examiner—Loha Ben
Attorney, Agent, or Firm—Collard, Roe & Galgano

[57] ABSTRACT

A contact lens holder including a lens holder and a support for positioning the lens before an optical instrument for visual inspection of the lens. An annular ring having a generally C-shaped channel cross section which defines a groove is provided for accepting and holding the periphery of a soft lens. Similarly, a U-shaped resilient fork holds the periphery of a rigid lens, for central inspection thereof. A hemispherical element is provided for holding a soft lens, and a clip device is provided for holding a rigid lens, during peripheral area inspection. The holder facilitates contact lens inspection using a biomicroscope.

19 Claims, 3 Drawing Sheets

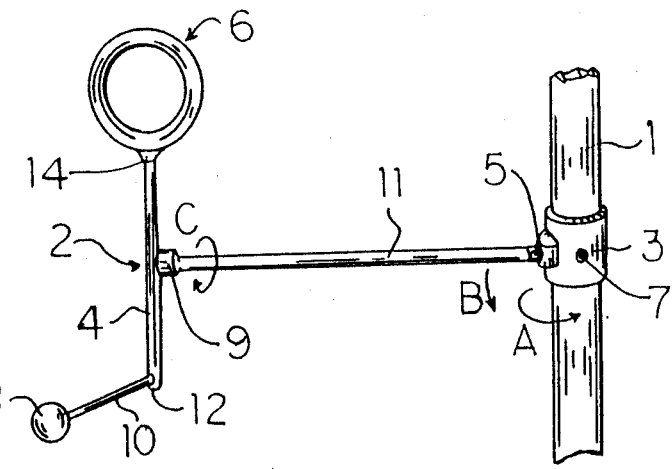
FIG.1
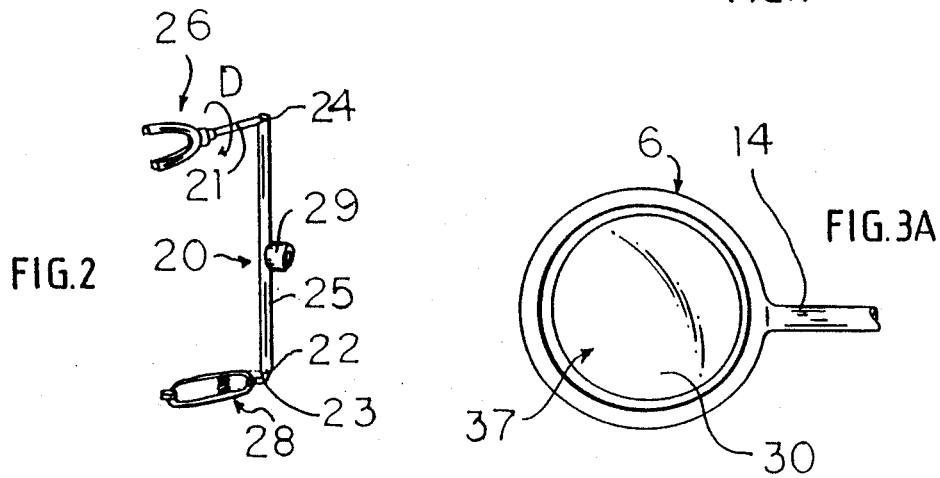
FIG.2
FIG.3A
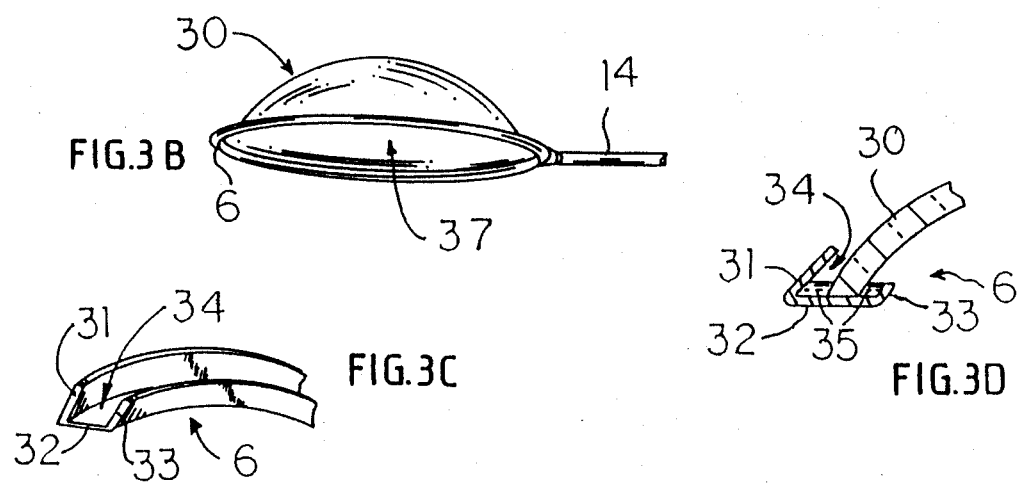
FIG.3B
FIG.3C
FIG.3D

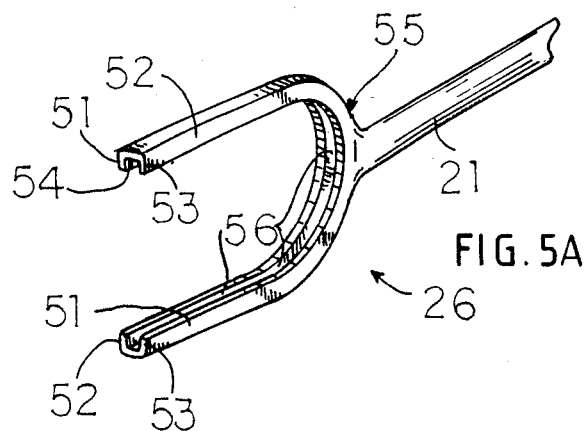
FIG. 5A
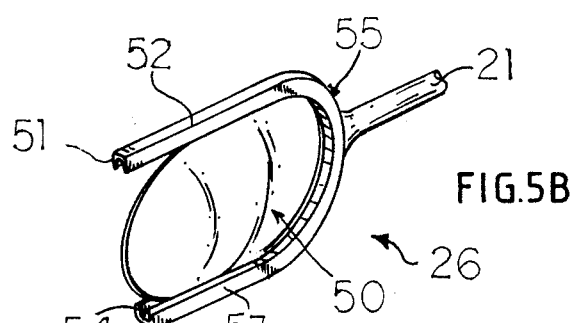
FIG. 5B
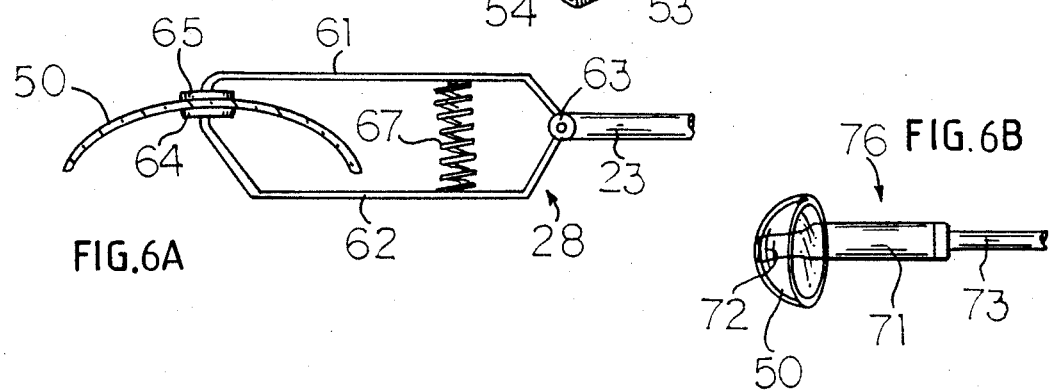
FIG. 6A
FIG. 6B
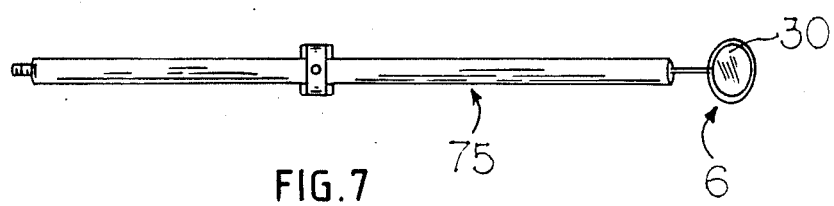
FIG. 7

CONTACT LENS HOLDER

The invention relates to holders for contact lenses. More particularly, it relates to holders for contact lenses which are attachable to a slit lamp biomicroscope for holding contact lenses in a stable manner, to permit lens examination or inspection using the biomicroscope.

Careful examination of patients contact lenses is frequently required during office visits. However, this examination can be difficult without using specialized equipment. The condition of a contact lens, deposits on the lens and damage to the lens can be effectively visually inspected only through the use of a biomicroscope or slit lamp, a piece of equipment which is usually already present in almost every eye practitioner's office. However, to achieve a direct high power examination of a contact lens using a biomicroscope, the contact lens must be held in the practitioner's hands, or it must be held with a plastic lens forceps. Even under the best conditions, effective hand-held or forceps-held lens examination is nearly impossible due to hand movement, and the substantial difficulty of properly positioning the lens in front of the biomicroscope optics. Furthermore, the use of hands or forceps to hold the lens during examination necessarily covers a portion of the lens, thereby preventing inspection of the covered portion. To achieve a complete inspection while a lens is held in hand or by forceps, the lens must be repositioned at least once. This involves increased handling of the lens. Accordingly, hand-held or forceps-held inspection is not only time-consuming, but also requires use of substantial effort and dexterity by the practitioner. Moreover, the increased handling requirements of this type of inspection increase the risks of dropping the lens, resulting in its loss or damage. Furthermore, although conventional binocular microscopes are possibly useful for contact lens examination, they are rarely present in the offices of eye-care practitioners.

Accordingly, it is an object of the invention to provide a contact lens holder which allows for a complete and simple examination of a contact lens.

It is also an object of the invention to provide such a holder which may be readily attached to a biomicroscope or slit lamp of the type which are present in most eye-care offices.

It is a further object of the invention to provide such a holder having a stable mechanical base allowing for a complete direct high power examination of a contact lens using readily available eye-care office equipment, without the need for hand or forceps holding and manipulation of the contact lens.

It is yet another object of the invention to provide such a lens holder which is capable of safely and securely holding both rigid and soft contact lenses in air, without requiring that the lenses be immersed in water or saline solution.

It is yet a further object of the invention to provide such a novel contact lens holder which is of relatively simple construction, inexpensive to manufacture, and which may be easily and quickly used to examine contact lenses.

SUMMARY OF THE INVENTION

Certain of the foregoing and related objects are readily attained with a contact lens holder which includes holding means for holding a contact lens in a manner allowing for visual inspection of the lens, and means for supporting the holding means in a desired position so that the lens may be visually inspected with an optical instrument, such as a biomicroscope. Preferably, the means for holding is disposed at one or both ends of a post which is rotatably and releasably joined to a tube- or bar-like bridge. The bridge may be pivotally and releasably clamped onto a support, such as a side rail of a biomicroscope.

Most desirably, the post is provided in two embodiments, one intended for use with soft contact lenses, and a second embodiment intended for holding rigid lenses. For use with soft lenses, the post includes a means for peripherally holding the lens at one end, with the other end of the post having means for centrally holding a contact lens. Preferably, the device for peripherally holding the lens is rotatably attached to one end of the post and includes an annular ring having a generally C-shaped channel cross section which defines a groove for accepting the periphery or circular edge of a contact lens. The annular ring may have an outside wall joined to an annular base, and an inside wall joined to the base and radially spaced apart from, and extending parallel to, the outside wall. The inside and outside walls preferably both extend away from the base in a direction inclined towards the center of the ring. For ease of use, the inside wall can be made shorter than the outside wall. The ring advantageously has a diameter of approximately from 12.5 to 15 mm.

At the other end of the post (i.e., at the end opposite to the post end for peripherally holding) means for centrally holding a contact lens may be mounted, which preferably includes a generally hemispherical element spaced apart from the post end by a stem attached pivotally and perpendicularly to the post. The stem is advantageously about $\frac{1}{2}$ of the length of the post.

In the embodiment of the post for use with rigid lenses, a stem is pivotally joined at one end of the post and supports means for peripherally holding the lens which includes a generally U-shaped resilient fork having a substantially C-shaped channel-like cross section. On the interior of the fork, i.e., on the surfaces which contact the lens, a lining of a soft material, such as soft rubber or plastic, is provided. At the other end of the post, means for centrally holding a lens preferably comprise a clip device pivotally mounted to the post and having two opposing arms, each of which has a free end and a fixed end, with the fixed ends being joined at a common pivot point. At the free end of one of the arms is mounted a concave tip. On the free end of the other opposing arm, a corresponding convex tip having a curvature matching that of the concave tip is provided. The tips are substantially in alignment with each other, and are releasably biased together by, e.g., a spring, so that a contact lens may be centrally held between the tips for inspection of its peripheral areas. The tips may be made of soft rubber, and are preferably of a diameter of less than 3 mm. Alternatively, a suction device may be attached to the post for centrally holding a lens.

In a preferred embodiment of the invention, the bridge is pivotally attached to the collar, so that when the collar is mounted onto a support, e.g., the side rail of a biomicroscope, the bridge may be reversibly pivoted from a storage position wherein it is generally parallel to and alongside of the support, to an operating or in-use position wherein the bridge is generally perpendicular to the support. Furthermore, it is advantageous for the post to be releasable from the bridge, so that different posts, i.e., a post for inspecting soft lenses, and a post for inspecting rigid lenses, may be readily interchanged on the bridge, and so that the bridge can be placed into its storage position, without the post attached thereto. It is also advantageous if the post is pivotally attached to the end of the bridge so that the post may be readily manipulated to bring the lens being inspected into a convenient inspection position, e.g., in line with the optics of a biomicroscope.

Other objects and features of the present invention will become apparent from the following detailed description when taken in connection with the accompanying drawings, which disclose several embodiments of the invention. It is to be understood that the drawings are designed for the purpose of illustration only and are not intended as a definition of the limits of the invention.

BRIEF DESCRIPTION OF THE DRAWINGS

In the drawings, wherein similar reference numerals denote similar elements throughout the several views:

FIG. 1 is a fragmentarily-illustrated perspective view of a lens holder according to the invention having a post with a ring at one end and a hemispherically-shaped element at the other end thereof, for holding soft contact lenses during inspection;

FIG. 2 is a fragmentarily-illustrated perspective view of a second embodiment of the invention having a fork at one end of the post, and a clip at the other end thereof, for holding rigid contact lenses during inspection;

FIG. 3A is a fragmentarily-illustrated top perspective view, rotated 90° counterclockwise, of the ring of FIG. 1 holding a contact lens;

FIG. 3B is a fragmentarily-illustrated side and bottom perspective view of the ring of FIG. 3A;

FIG. 3C is a fragmentarily-illustrated enlarged perspective sectional view of the ring of FIG. 3B;

FIG. 3D is an enlarged fragmentarily-illustrated sectional view of the lens and ring of FIG. 3B;

FIG. 5A is an enlarged fragmentarily illustrated perspective view of the fork of FIG. 2;

FIG. 5B is a fragmentarily illustrated perspective view of the fork of FIG. 5A holding a rigid contact lens;

FIG. 6A is an enlarged fragmentarily illustrated side elevational view in part section of the clip of FIG. 2;

FIG. 6B is a fragmentarily illustrated perspective view of a suction device for centrally holding contact lenses; and FIG. 7 is a perspective view of an Hruby lens mount having the lens holder ring of FIG. 1 attached to one end thereof.

DETAILED DESCRIPTION OF THE PREFERRED EMBODIMENTS

Figure 3E:
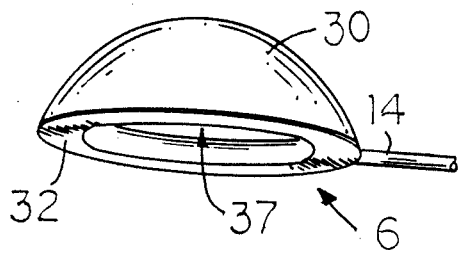
FIG. 3E is an enlarged fragmentarily-illustrated front and bottom perspective view of the ring of FIG. 3B, holding an oversized contact lens along its periphery.

Turning now in detail to the appended drawings, therein illustrated is a novel contact lens holder embodying the present invention which, as shown in FIG. 1, basically includes a collar 3 joined to a bridge 11 via a pivot joint 5. Collar 3 is clampable on a support 1, which can conveniently be the side rail of a conventional slit lamp or biomicroscope, via a set screw 7. A post assembly 2 includes a post 4 having a ring 6 pivotally attached to its one end 14. A stem 10 supporting a hemispherical element 8 is perpendicularly attached to post 4 at post end 12. Post assembly 2 is joined to bridge 11 via joint 9, which may be a releasable swivel joint. Post assembly 2 is especially intended for holding soft contact lenses.

As shown in FIGS. 3A and 3B, when a contact lens 30 is held by ring 6, the entire lens is readily available for visual inspection, except for the extreme perimeter of the lens, as ring 6 has a narrow cross section and encloses a relatively large circular open area 37. The particular structure of ring 6 is detailed in FIG. 3C wherein outside ring wall 31 and inside ring wall 33 are integrally attached to an annular base 32, thereby forming a groove 34 for accepting the perimeter or edges of a contact lens. Inside wall 33 and outside wall 31 are parallel to each other and extend from base 32 at an angle inclined toward the center of ring 6. As clearly illustrated in FIG. 3D, inside wall 33 is substantially shorter than outside wall 31, so that a lens 30 may be easily placed into groove 34 of ring 6. Groove 34 may also be filled with a liquid, e.g., water or saline solution, for lubricating the lens and preventing its dehydration during inspection. A liquid 35 in groove 34 also allows ring 6 to more securely hold the lens in place within groove 34 via capillary attraction of liquid 35.

Figure 3F:
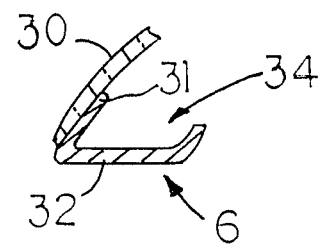
FIG. 3F is an enlarged fragmentarily-illustrated sectional view of the ring and lens of FIG. 3E.

Outer wall 31 generally has a diameter of from 12.5 to 15 mm at its upper edge, so that most contact lenses can be accommodated within groove 34. However, to hold lenses having a diameter larger than 15 mm, as shown in FIGS. 3E and 3F, lens 30 may be placed outside of groove 34 and over outside wall 31. The lens adheres directly onto the frustro-conical surface formed by outside wall 31 via capillary attraction.

Figure 3G:
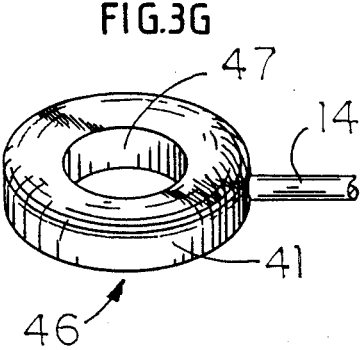
FIG. 3G is a fragmentarily-illustrated perspective view of an alternative embodiment of the ring of FIG. 3B.
Figure 3H:
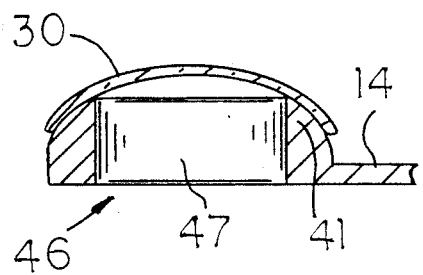
FIG. 3H is a fragmentarily-illustrated cross-sectional view of the holder of FIG. 3G, with a contact lens held thereon.

A similar holding method is also used in an alternative embodiment of ring 6 as illustrated in FIGS. 3G and 3H, wherein modified ring 46 has the form of a curved or dome-topped washer, and does not include any groove. Modified ring 46 has a rounded or curved upper section or shoulder 41 forming a domed-annular ring for holding a lens 30, again via fluid capillary attraction forces. Ring 46 also has a relatively large central hole or opening 47 to permit inspection of the central areas of lens 30.

Figure 4A:
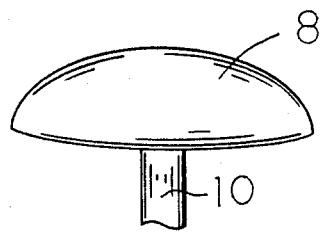
FIG. 4A is an enlarged fragmentarily-illustrated perspective view of the hemispherical element of FIG. 1.
Figure 4B:
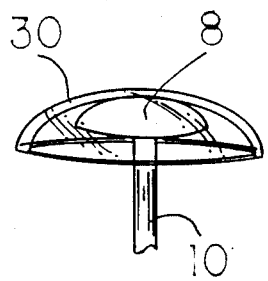
FIG. 4B is an enlarged fragmentarily illustrated perspective view of the holder of FIG. 4A with a contact lens held thereon.

For inspecting the periphery or edge areas of soft lenses, hemisphere 8 is attached to stem 10, as shown in FIGS. 1 and 4A. The solid radius of hemisphere 8 is formed so that it approximates the radius of curvature of an average soft contact lens, i.e., approximately 8.7 mm. As shown in FIG. 4B, lens 30 is centrally placed directly onto hemisphere 8 and is held in place through direct capillary attraction. As hemisphere 8 has a diameter of approximately 5 mm, it generally obscures only about ⅓ of the diameter of lens 30, such that the lens edges remain free and unobscured for complete visual inspection.

Referring once again to FIG. 1, if inspection of rigid contact lenses is desire,, post assembly 2, which is designed for use with soft contact lenses, is removed from bridge 11 via joint 9, and is replaced with the post assembly of FIG. 2, which is designed for holding rigid contact lenses. As shown in detail in FIG. 2, the post assembly 20 for use with rigid lenses includes a post 25 linked at post end 24 to a support 21 which rotatably holds a fork 26. At the other end of post 25 is a clip assembly 28 attached to post end 22 by a support 23.

The construction of fork 26 is shown in detail in Fig. 5A wherein fork 26 includes a U-shaped section 55 having a groove 54 extending along its inside surface. Groove 54 is formed by walls 51 and 53 which are joined to base 52 to form a generally C-shaped channel-like cross section. U-shaped element 55 is made of a resilient material, such as spring metal and is dimensioned so as to lightly hold a rigid lens within groove 54, as shown in FIG. 5B. The material and design of U-shaped element 55 are selected so that only a minimal amount of compression is exerted on rigid lens 50, so as to minimize the amount of distortion created in gas permeable and other thin contact lenses. Groove 54 is lined with grooved silicone or some other soft rubber or plastic, so that the edges of lens 50 are engaged on a soft material, to prevent damage to the lens.

The clip 28 shown in FIG. 2 which is used for edge inspection of rigid lenses is best illustrated in FIG. 6A which shows clip 28 engaged onto a rigid lens 50. At the free end of support 23 is a pivot point 63 at which clamp arms 61 and 62 are pivotally joined. At the other ends of arms 61 and 62 are matching convex and concave end tips, 65 and 64, respectively. Tips 64 and 65 have a diameter of 3 mm or less and provide surfaces for holding lens 50. The solid radii of tips 64 and 65 are mutually complimentary, and the tips are made of soft rubber or plastic, so that the lens may be held securely without the risk of damage. A tension spring 67 joins arms 61 and 62, so as to bias tips 65 and 64 together with the minimum compression necessary to hold the lens.

An alternative for centrally holding a rigid contact lens to allow for edge inspection, as illustrated in FIG. 6B, is a suction device 76 having a flexible bulb 71, and a nozzle-like opening 72 for engaging the lens. Suction device 76, which operates in the manner of, e.g., an eye dropper, can be attached to post end 22 by support 73, when suction device 76 is used in place of clamp 28 for edge viewing of rigid contact lenses.

As many biomicroscopes already have an Hruby lens mount, the various holders of the invention can be adapted to fit this existing lens mount, as shown in FIG. 7, wherein ring 6 is attached to Hruby lens mount 75.

Turning now in particular to the operation and use of the lens holders of the invention, the lens to be inspected is simply placed onto a holder unit, i.e., ring 6 or 46, hemisphere 8, fork 26, clip 28, or suction device 76, which is appropriately selected depending upon whether the lens is soft or rigid, and whether the center or periphery of the lens is to be inspected. In the case of soft lenses, saline solution is advantageously placed on the lens holder. By pivoting collar 3 about its support in the direction of arrow A, (FIG. 1), the lens may be quickly positioned in front of the biomicroscope to allow a direct visual inspection of the lens through the optics of the microscope. Further adjustments and viewing angles and positions can also be made by sliding collar 3 up or down on its support 1, by pivoting post assembly 2 with respect to bridge 11 in the direction of arrow C and/or by swiveling the holder unit in use, e.g., fork 26 about support 21 in the direction of arrow D. For storage purposes, bridge 11 may be pivoted, as shown by arrow B, via pivot joint 5 so that it rests alongside support 1, and post assembly 2 or 20 removed from bridge 11 via joint 9.

Thus, while only several embodiments of the present invention have been shown and described, it will be obvious that many changes and modifications may be made thereunto, without departing from the spirit and scope of the invention.

What is claimed is:

1. A contact lense holder comprising:
holding means including central and peripheral lens support means capable of alternately supporting the central portion and the peripheral portion of a contact leans in a manner leaving the unsupported portion of the lens uncovered on both sides thereof allowing for visual inspection through the lens; and
means for supporting said holding means in a desired position so that the lens may be visually inspected with an optical instrument, said means for supporting said holding means including a means for rotating said holding means with respect thereto in a plane generally perpendicular to a surface supporting said contact lens holder.

2. The holder of claim 1, wherein said means for holding comprises an annular ring having a generally C-shaped channel cross section defining a groove for accepting the periphery of a contact lens.

3. The holder of claim 2, wherein said ring includes an outside wall joined to an annular base, and an inside wall joined to said base and radially spaced apart from said outside wall to form said groove, said inside wall extending parallel to said outside wall, said inside wall and said outside wall extending away from said base in a direction inclined towards the center of said ring, said outside wall thereby providing a frusto-conical surface for holding a contact lens.

4. The holder of claim 3, wherein said inside wall is shorter than said outside wall.

5. The holder of claim 4, wherein said ring has an outside diameter of about from 12.5 to 15 mm.

6. The holder of claim 1, wherein said means for holding comprises a stem having a generally hemispherical element disposed at one end thereof for centrally holding a lens.

7. The holder of claim 1, wherein said means for holding comprises a generally U-shaped resilient fork having a substantially C-shaped channel-like cross section.

8. The holder of claim 7, further comprising a lining of soft material disposed within said C-shaped channel cross section.

9. The holder of claim 1, wherein said holding means includes a centrally located suction device.

10. The holder of claim 1, further comprising a post having said means for holding attached to each of its ends.

11. The holder of claim 10, further comprising a bridge joining said post to a clamping means attachable to a support.

12. The holder of claim 11, wherein said clamping means is a collar.

13. The holder of claim 11, wherein at least one of said post and clamping means are releasably attached to said bridge.

14. The holder of claim 11, wherein at least one of said post and clamping means are pivotally attached to said bridge.

15. The holder of claim 12, wherein said collar means comprises a tubular collar attachable via setscrews to a side rail of a biomicroscope.

16. The holder of claim 12, wherein said bridge is pivotally attached to said collar, such that when said collar is attached to a support, said bridge may be reversably pivoted from a storage position wherein said bridge is generally parallel to the support, to an operating position wherein said bridge is generally perpendicular to the support.

17. A contact lens holder comprising:

a holding means for holding the contact lens in a manner allowing for visual inspection of the lens, said holding means including a clip device having two opposing arms each of which has a free end and a fixed end, said fixed ends joined at a common pivot point;

18. The holder of claim 17, wherein said concave and convex tips have a diameter of approximately less than 3 mm.

19. The holder of claim 17, wherein said convex and concave tips are made of soft rubber.

a concave tip disposed at the free end of one of said arms;

a convex tip having a curvature matching that of said concave tip, disposed at the free end of said other arm, with said tips being generally aligned with each other;

means for releasably biasing said tips together, such that said clip may releasably and centrally hold a lens; and means for supporting said holding means in a desired position so that the lens may be visually inspected with an optical instrument.

* * * * *